US008365906B2

United States Patent
Moeschen-Siekmann et al.

(10) Patent No.: US 8,365,906 B2
(45) Date of Patent: Feb. 5, 2013

(54) STEEL CORD CONVEYER BELT WITH A CONNECTING HINGE FOR COUPLING TWO BELT ENDS

(75) Inventors: Michael Moeschen-Siekmann, Noerten-Hardenberg (DE); Achim Huels, Barsinghausen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 13/421,942

(22) Filed: Mar. 16, 2012

(65) Prior Publication Data

US 2012/0205223 A1    Aug. 16, 2012

Related U.S. Application Data

(63) Continuation of application No. PCT/EP2010/063945, filed on Sep. 22, 2010.

(30) Foreign Application Priority Data

Sep. 23, 2009  (DE) .................. 10 2009 044 080

(51) Int. Cl.
*F16G 3/02* (2006.01)
*B65G 15/30* (2006.01)
(52) U.S. Cl. ..................... 198/844.2; 198/847
(58) Field of Classification Search .......... 198/844.2, 198/847
See application file for complete search history.

(56) References Cited

U.S. PATENT DOCUMENTS

| 3,131,077 A | 4/1964 | Barnby et al. |
| 3,748,698 A | 7/1973 | Lachmann |
| 5,246,101 A | 9/1993 | Flebbe |
| 5,360,103 A * | 11/1994 | Loosli .................. 198/844.2 |
| 5,620,085 A * | 4/1997 | Cadou et al. ........... 198/844.2 |
| 5,884,369 A * | 3/1999 | Schick et al. .............. 24/33 P |
| 6,196,378 B1 * | 3/2001 | Borner ................... 198/844.2 |
| 6,238,131 B1 * | 5/2001 | Watts et al. ............... 403/337 |
| 6,353,976 B1 * | 3/2002 | Sutherland .................. 24/33 P |
| 6,896,125 B2 * | 5/2005 | Webster et al. .......... 198/844.2 |
| 7,344,020 B2 * | 3/2008 | Grywacheski et al. ... 198/844.2 |
| 7,824,593 B2 * | 11/2010 | Mukuda .................... 264/279 |
| 7,980,979 B2 * | 7/2011 | Jakob ......................... 474/253 |

FOREIGN PATENT DOCUMENTS

| DE | 1 750 481 A1 | 10/1970 |
| DE | 295 19 856 U1 | 5/1996 |
| JP | 62-77350 A | 4/1987 |

OTHER PUBLICATIONS

International Search Report dated Nov. 30, 2010 of international application PCT/EP 2010/063945 on which this application is based.

* cited by examiner

*Primary Examiner* — Douglas Hess
(74) *Attorney, Agent, or Firm* — Walter Ottesen

(57) ABSTRACT

A conveyor belt with a reinforcement support layer consisting of steel cords running in parallel has, at each end, the hinge-like configuration for coupling to another belt end. In order also to provide a hinge connection for steel cord conveyor belts having relatively large cord diameters, each belt end (1, 2) has a part hinge (6, 7). Each part hinge (6 and 7) has a hinge bar (12 and 13) on which an integrated clamping plate (14 and 15) is integrally formed. The integrated clamping plate (14 and 15) is seated in the one belt outer surface (18) of the conveyor belt. On the opposite belt outer surface (22), a corresponding, separate clamping plate (24 and 27) is seated in each case in the rubber cover layer there. The clamping plate of each part hinge securely clamps the corresponding thickness-reduced belt end therebetween.

11 Claims, 6 Drawing Sheets

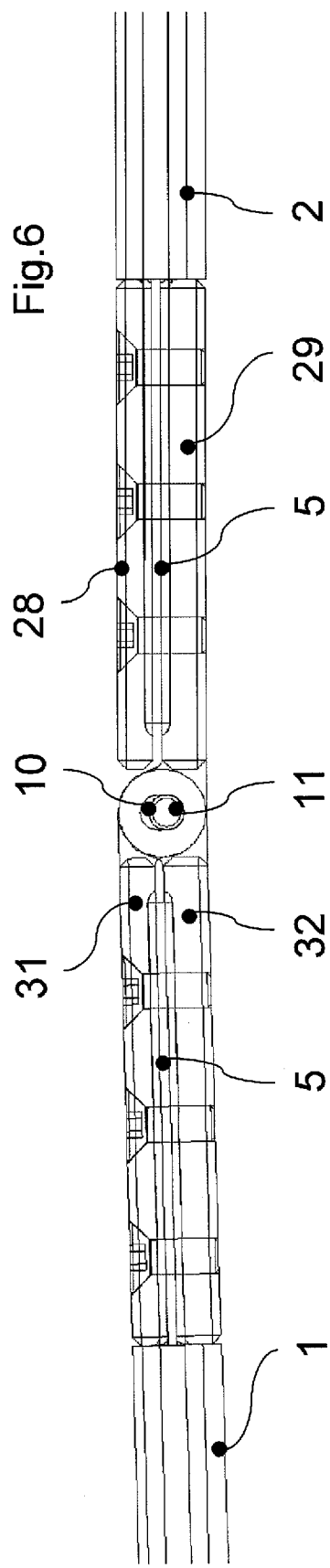

STEEL CORD CONVEYER BELT WITH A CONNECTING HINGE FOR COUPLING TWO BELT ENDS

CROSS REFERENCE TO RELATED APPLICATIONS

This application is a continuation application of international patent application PCT/EP 2010/063945, filed Sep. 22, 2010, designating the United States and claiming priority from German application 10 2009 044 080.1, filed Sep. 23, 2009, and the entire content of both applications is incorporated herein by reference.

FIELD OF THE INVENTION

The invention relates to a conveyer belt or conveyer belt segment of elastomeric material with a reinforcing support layer of steel cords which run in the longitudinal direction of the conveyer belt and are arranged parallel to one another. Each belt or segment end has a formation for the hinge-like coupling together to another belt or segment end.

BACKGROUND OF THE INVENTION

It is known to join conveyer belts of elastomeric material continuously by the two ends of the conveyer belt being joined in the end regions after specific finishing of the rubber covering layers and by the ends being connected non-detachably to each other by vulcanization.

This is standard practice particularly in the case of steel cord conveyer belts and is used even following damage and subsequent repair of a steel cord conveyer belt. After the belt ends are overlapped and the exposed steel cord end sections placed one inside another and after rubber covering plates are placed on, a steel cord belt connection is produced by vulcanization. The outlay on apparatus and time for producing a steel cord belt connection of this type is high. The production process or conveying process is interrupted during this time.

In order to achieve at least an emergency operation of the conveyer system, it is known from U.S. Pat. No. 5,246,101 to expose some steel cord ends at both broken ends of the belt and to couple these ends frictionally to a separate coupling piece of firm material. However, this connection should be regarded merely as a short-term connection for an urgently-required conveyer system within the context of an emergency connection having reduced load-bearing capacity. After a possible shutdown of the conveyer system, the conveyer belt is customarily closed again continuously by vulcanization of the two ends thereof.

For certain conveyer belts, endless connections or end connections by means of mechanical connecting devices are also known. In this case, the particular belt end has a mechanical connecting part which is releasably coupled to the connecting part of the other belt end in each case. One such releasable connecting form is the hinge form. In this case, the belt ends each have a part hinge which is joined together in a complementary manner to the part hinge of the upper belt end in each case and is connected in a tension-proof manner thereto by a coupling rod guided through the crenellated, intermeshing hinge eyes.

These releasable connections are used particularly for conveyer belts which can be fitted only with a large outlay or which have to be more frequently exchanged, shortened or lengthened during operation. These hinge connections are predominantly used in the case of fiber-reinforced conveyer belts. In the case of steel cord conveyer belts, the hinge-like connections have not been able to gain acceptance, since the tension-proof connection of the hinge parts to the belt ends constitutes an unresolved problem.

It is known from U.S. Pat. No. 3,131,077 to provide conveyer belt segments with a cord insert made of steel wires. The wire cord insert consists of a narrow rubber band which is laid helically over the width of the belt and receives some wires in the vulcanizable rubber mixture thereof, which is rolled out to form the band, lying next to one another in parallel in a horizontal plane. At each segment end, the rubber band is shaped by being laterally offset twice in each case to form a plurality of loops. When returning from each loop, the rubber band again undergoes a lateral offset and runs laterally next to the band supply in the same horizontal plane. The rubber band thereby forms a plurality of spaced-apart, rubberized loops lying in one plane at both ends of the conveyer belt segment. The steel wires are deflected from the direction thereof, running in the belt segment, to the loop region and from the latter. The loops which are formed lie at a distance from one another in the form of crenellations. Complementary, rubberized loops of the belt end of another conveyer belt segment can engage in the intermediate spaces formed in this manner. The two rows of loops are coupled to one another in a hinge-like manner by means of a coupling rod.

The steel wires shaped to form the loop have to be very sharply deflected. This leads to a significant reduction in the permissible tensile loading and to a risk of the steel wires breaking. It is apparent that only very thin steel wires can be deformed in this way at all. This construction is unsuitable for steel cord conveyer belts which transmit large forces and have relatively rigid steel cords. In addition, the thickness of the entire belt cross section is inevitably increased in the region of the belt end by the construction, which is disadvantageous when the entire conveyer belt circulates in the conveyer system.

SUMMARY OF THE INVENTION

It is an object of the invention to provide a hinge connection even for steel cord conveyer belts or steel cord conveyer belt segments having average and larger cord diameters. The hinge connection is tension-proof and can be produced with little complexity.

The object is achieved according to the invention in that each belt or segment end is reduced in thickness in the end region by either the rubber covering layers on both sides of the conveyer belt being partially ablated or removed or the steel cords being exposed by the rubber layers of the belt, in that the thickness-reduced end region of the particular belt end is clamped between two clamping plates embedded in the opposite belt outer surfaces of the conveyer belt, and in that at least one of the two clamping plates has a part hinge at the free end thereof, including crenellated projections, which part hinge can be joined to another part hinge arranged at another belt end.

The two clamping plates of each clamping unit are connected to each other or braced in relation to each other via suitable fastening means. The fastening means penetrate the thickness-reduced belt body in the end regions. Threaded fasteners or rivets are suitable as the fastening means.

In an advantageous embodiment of the invention, each belt end is fastened to a part hinge which can be joined to another part hinge fastened at another belt end, in that the part hinge has a hinge bar arranged transversely with respect to the longitudinal direction of the belt, in that the hinge bar has crenellated apertured lugs at the free end thereof, in that an integrated clamping plate is integrally formed on the hinge bar opposite the apertured lugs, with a stop step being formed, the base surface of the integrated clamping plate and the lower outer surface of the hinge bar running in one plane, in that the integrated clamping plate is seated in the one rubber covering layer of the conveyer belt by reducing the thickness of the rubber covering layer, in that, on the other belt side, a corresponding, separate clamping plate is seated in the rubber covering layer there, the rubber covering layer bearing on the end edge against the stop step of the hinge bar, in that the two clamping plates are connected to each other in a manner receiving the thickness-reduced belt end section pressed therebetween.

The two-part design of the clamping unit, which is formed by the two clamping plates, of each hinge side permits thickness tolerances of the particular thickness-reduced belt end to be compensated for.

The clamping plates are preferably manufactured from metal and are provided with through bores in order to be connected to the corresponding covering-layer-reduced belt end of the steel cord conveyer belt by means of screws, rivets or other fastening elements.

In an advantageous embodiment of the invention, the clamping surface of at least one clamping plate is provided with transverse ribs. This reinforces the frictional clamping of the belt ends by means of an interlocking part.

In a further embodiment of the invention, the opposite clamping plates are both provided with crenellated projections which in each case together form a part hinge. This embodiment makes it possible to compensate for the forces which may lead to deformation of the clamping plates if the clamping plate is designed asymmetrically.

In a further advantageous embodiment of the invention, the inner sides of the clamping plates are provided with longitudinal grooves which are arranged at the same distance spacing with respect to one another as the steel cords. This design increases the force-tight clamping of the belt ends.

In a further advantageous embodiment of the invention, next to each longitudinal groove, a further longitudinal groove is arranged lying closely next thereto at a small distance. The provision of two parallel longitudinal grooves at a small distance makes it possible, during the installation, to compensate for varying cord distances or a parallel offset caused by manufacturing operations.

The invention enables the steel cord layer arranged in the longitudinal direction of the belt to run without being deflected. A complicated vulcanization of the belt ends to each other is no longer necessary. The fact that the hinge-like connecting device is reusable should be considered to be a further advantage.

The invention provides a connection of the belt ends of a conveyer belt or conveyer belt segments, by means of which connection transmission of the tensile forces permitted for the particular steel cord belt is ensured and which can be closed and released by means of simple tools. The construction parts of the particular part hinge are located substantially within the belt cross section.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
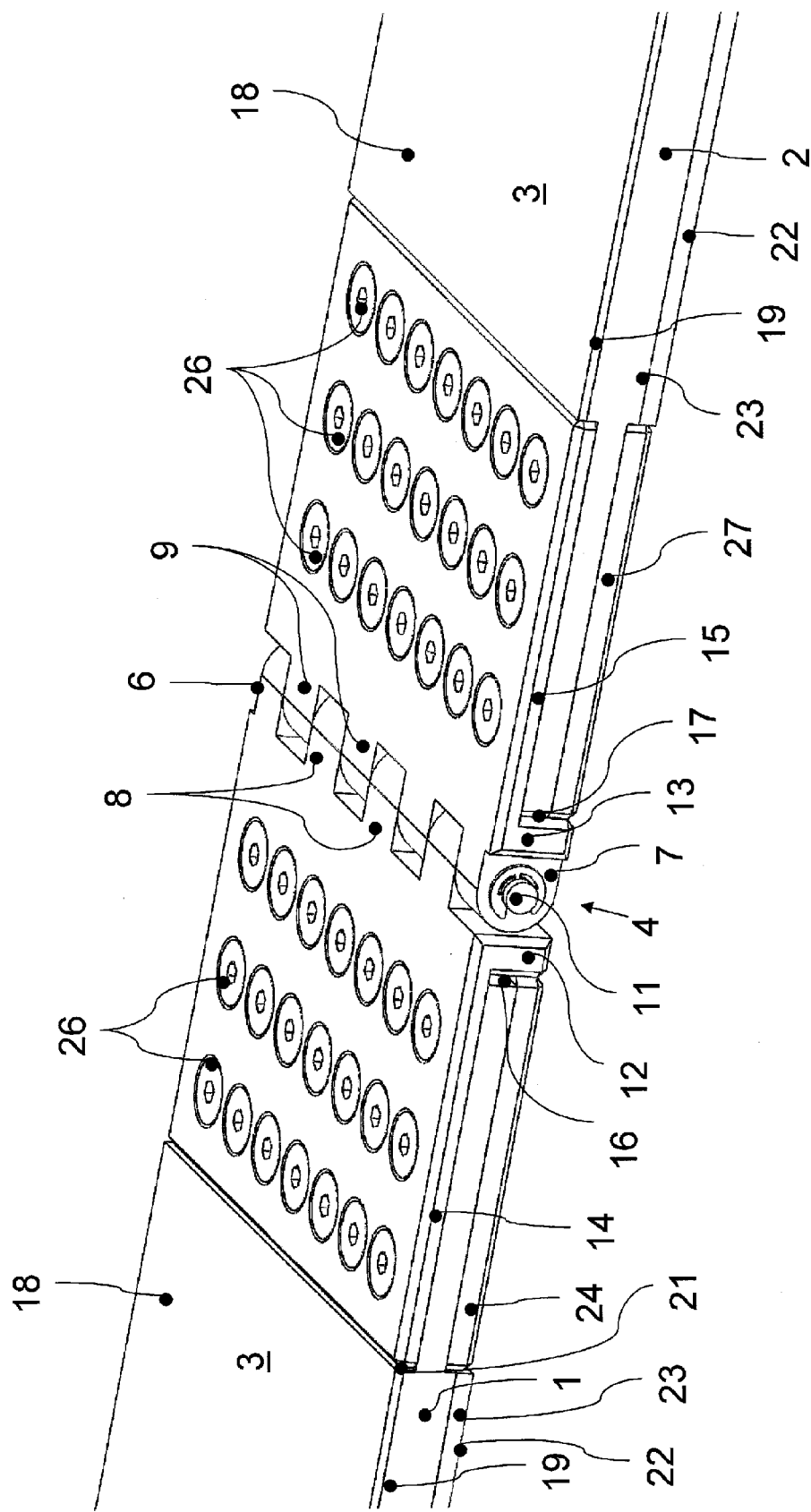
FIG. 1 shows a closed hinge connection of two ends of a steel cord conveyer belt according to a first embodiment of the invention.
Figure 3:
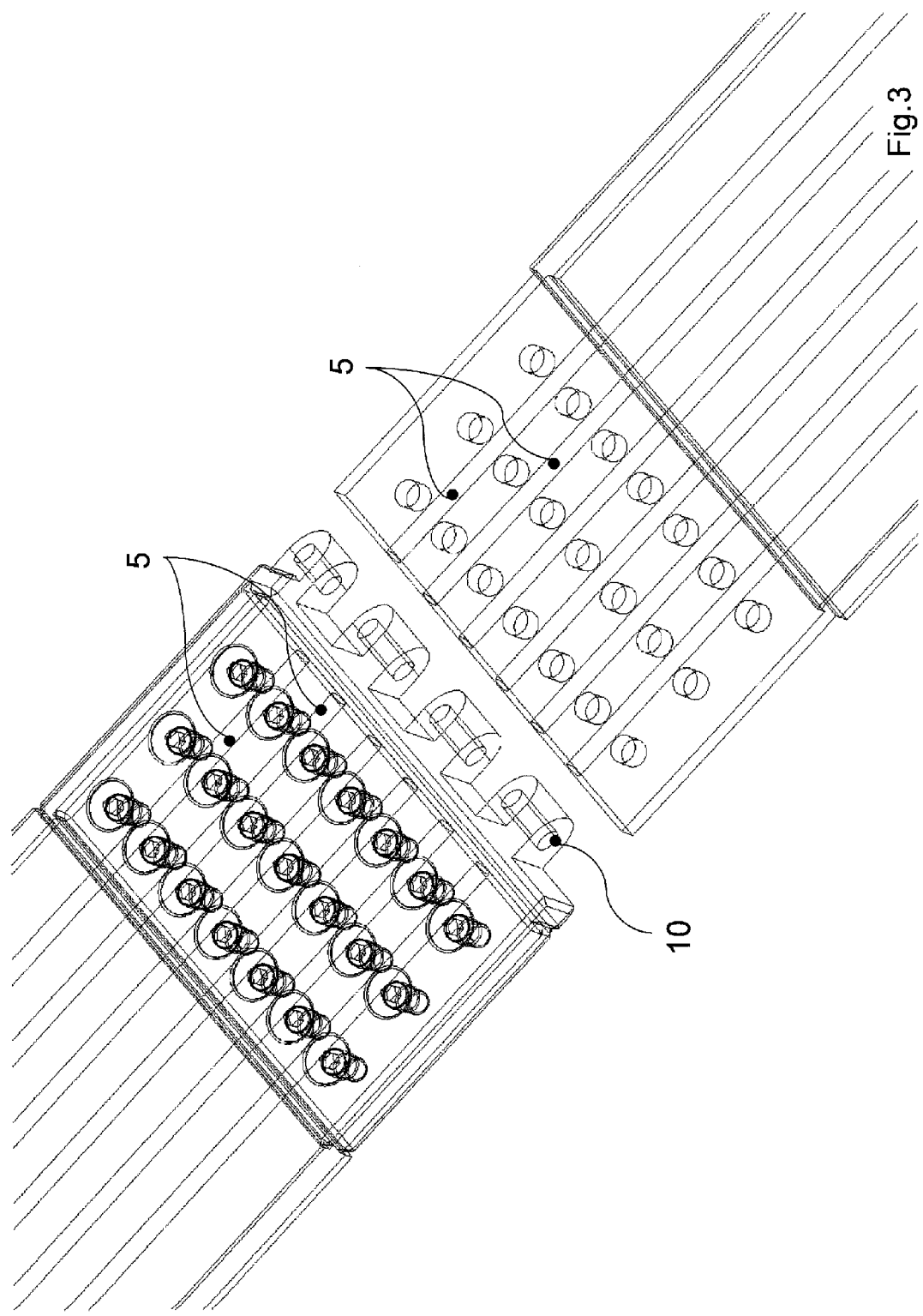
FIG. 3 shows the hinge connection in a transparent illustration to show the embedded parallel steel cords.

Two ends 1 and 2 of a steel cord conveyer belt 3 are connected to each other in a tension-resistant manner via a hinge 4 (FIG. 1). The steel cord conveyer belt 3 is constructed in a manner known per se from elastomeric material and has an embedded reinforcing support layer of steel cables or steel cords 5 arranged in parallel. To illustrate this embedding, the belt ends (1, 2) are illustrated in a transparent section in FIG. 3.

The hinge 4 is comprised of two part hinges 6 and 7 having crenellated projections 8 and 9 which intermesh in such a manner that the transverse bores 10 disposed in the projections 8 and 9 are aligned with each other to permit a coupling rod 11 to be introduced through the transverse bores 10 in order to complete the hinge 4. Each part hinge 6 or 7 comprises a hinge bar 12 or 13 carrying the crenellated projections (8, 9). The hinge bars (12, 13) have, facing away from the hinge, respective integrated clamping plates 14 and 15 which are integrally formed on the respective hinge bars 12 and 13 with respective vertical offsets. The vertical offsets define respective stop steps (16, 17).

Only one hinge side is described below. This description also applies similarly to the other hinge side. The part hinges 6 and 7 are of structurally identical design.

The integrated clamping plate 14 rests in a sheet-like manner on the upper side 18 of the belt end 1 (FIG. 1), wherein the covering rubber layer 19 of the upper side 18 is ablated in this region. The magnitude of the ablation 21 corresponds to the thickness of the integrated clamping plate 14. The integrated clamping plate 14 is therefore set into the belt upper side 18 virtually in alignment. The opposite belt lower side 22 is likewise ablated in the region of the belt end 1 by partial removal of a certain thickness of the lower rubber covering layer 23 and, in this region, receives a separate clamping plate 24, the dimensions of which correspond to the integrated clamping plate 14 of the upper side.

Figure 2:
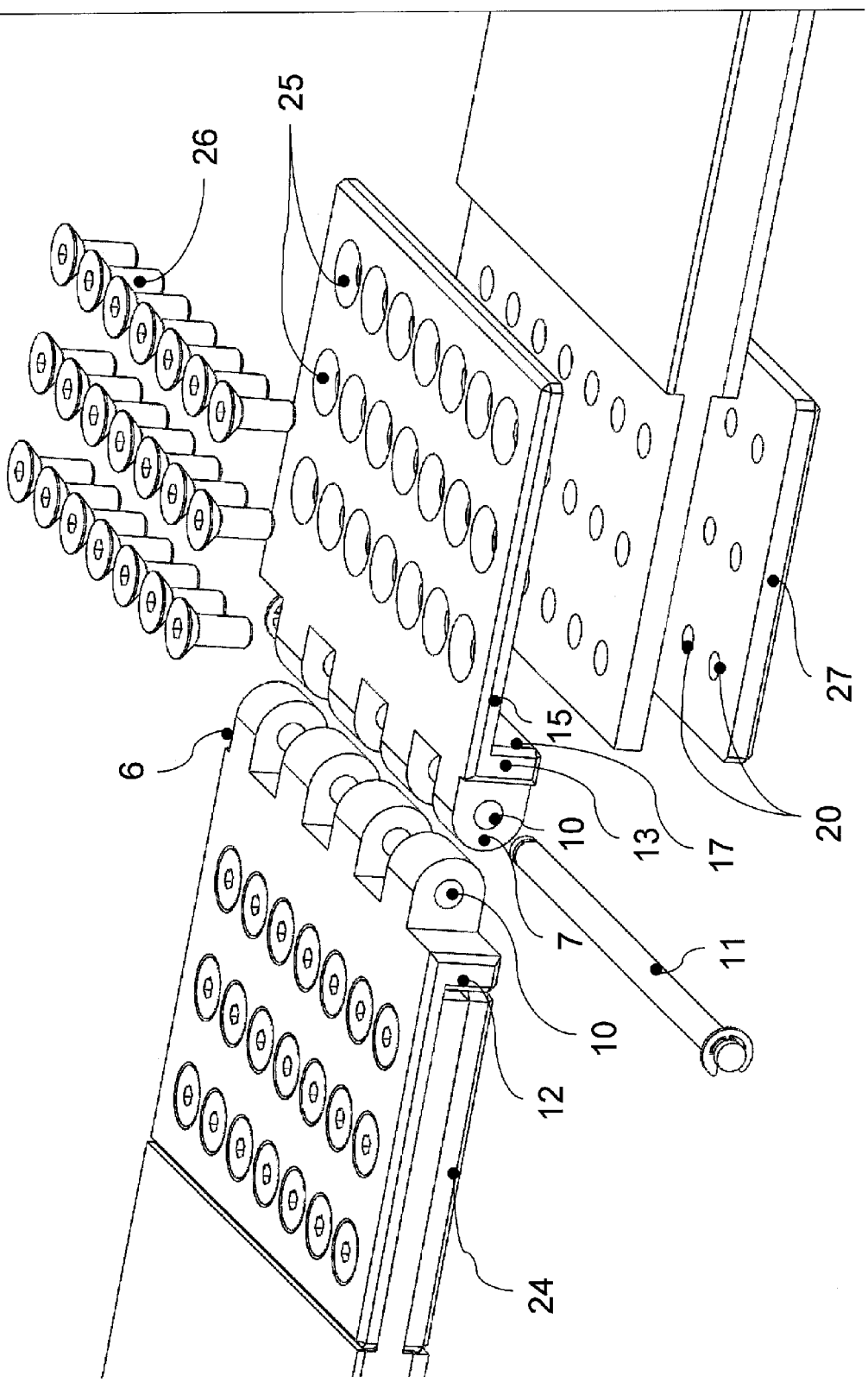
FIG. 2 shows the hinge connection illustrated in FIG. 1 in the released state.

The integrated clamping plates 14 and 15 each have three rows of through bores 25 transversely with respect to the belt width (FIG. 2). The separate clamping plates 24 and 27 each have three rows of threaded bores 20 transversely with respect to the belt width. The threaded bores lie congruently below the through bores 25.

The two clamping plates 14 and 24 of one hinge side form a clamping unit and, with the conveyer belt end 1 of reduced thickness being included, are joined together fixedly to each other by threaded fasteners 26 and, in the process, in each case squeeze the belt region located therebetween. The conveyer belt end 1 is clamped between the clamping plates 14 and 24. The conveyer belt end 2 is clamped between the clamping plates 15 and 27. The tensile forces are transmitted by shearing stresses in the rubber from the steel cords 5 via the clamping plates (14, 24) and (15, 27) to the hinge 4.

A modified hinge connection of two ends of a conveyer belt or of the ends of two conveyer belt segments are described below with reference to FIGS. 4 to 6.

Figure 4:
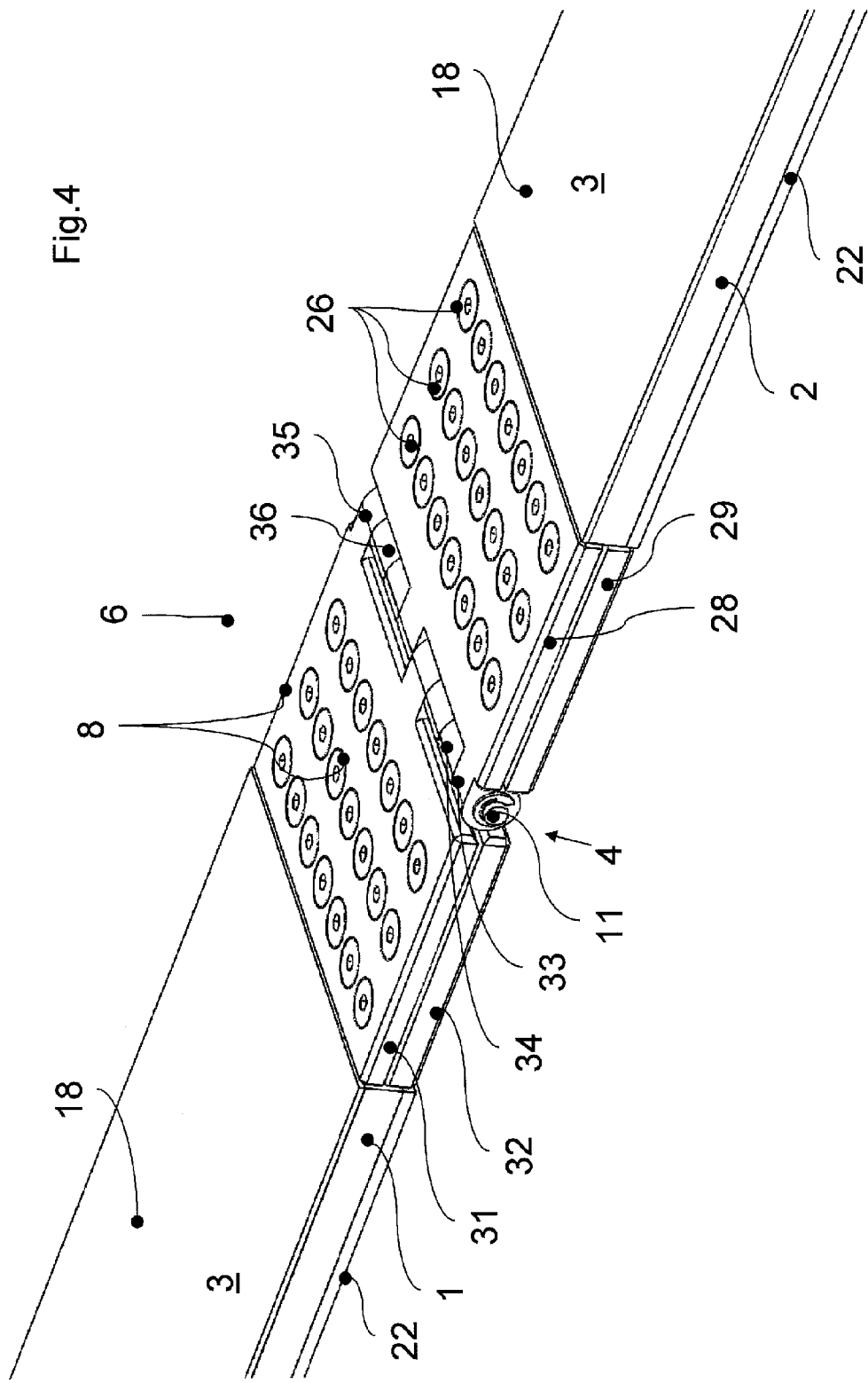
FIG. 4 shows a closed, modified hinge connection of two ends of a steel cord conveyer belt according to a second embodiment of the invention.
Figure 5:
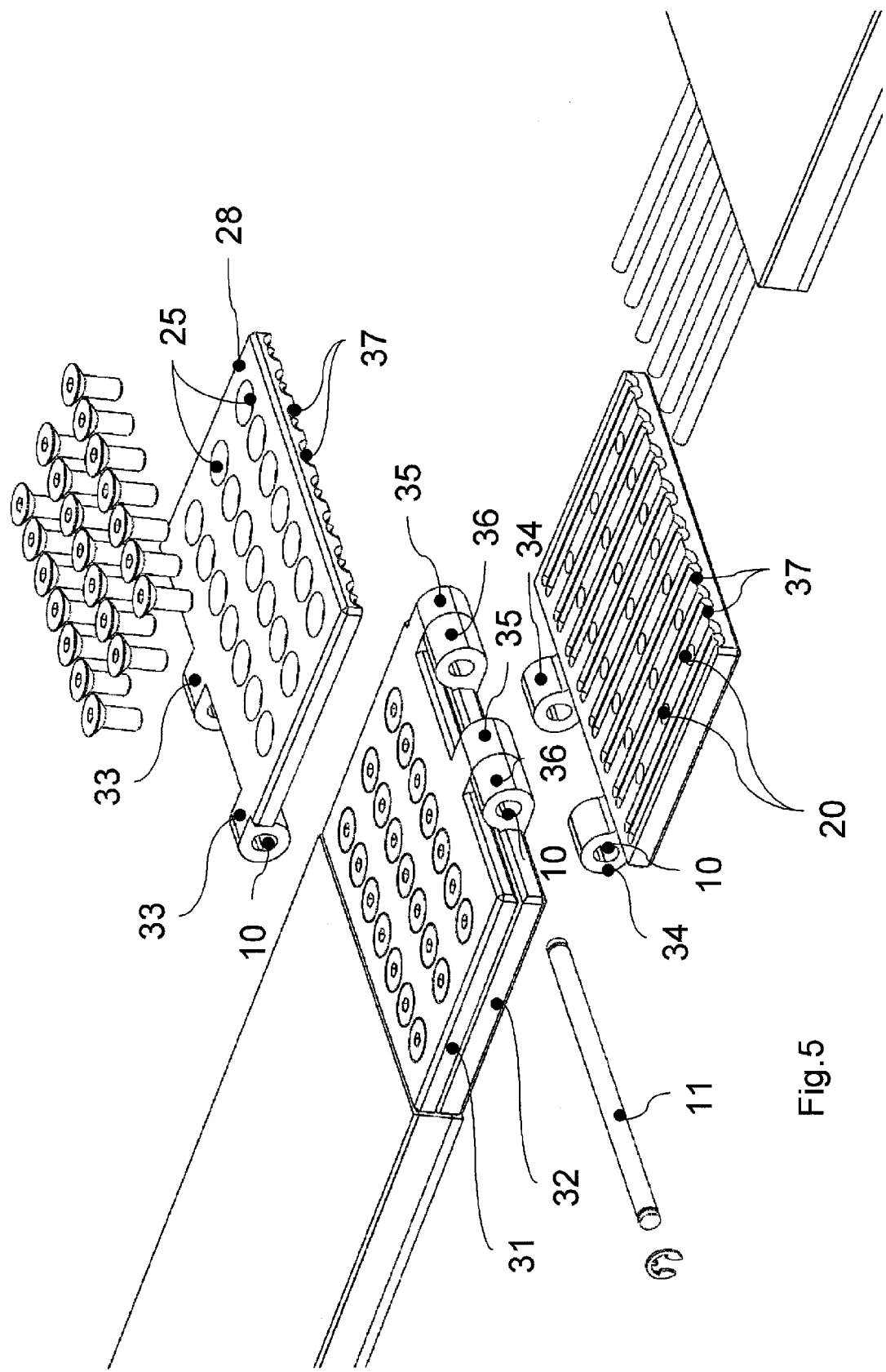
FIG. 5 shows the hinge connection illustrated in FIG. 4 in the released state; and, FIG. 6 shows a side view of the hinge connection according to FIG. 4 in a transparent illustration to show the clamping of the parallel steel cords.

The ends 1 and 2 of the steel cord conveyer belt 3 are connected to each other in a tension-proof manner via a hinge 4 (FIG. 4). The steel cord conveyer belt 3 is constructed in a manner known per se from elastomeric material and has an embedded reinforcing support layer of steel cables or steel cords 5 arranged in parallel (FIG. 5).

The rubber covering layers and the core rubber layer into which the steel cords 5 are embedded are removed in the end regions of the belt ends 1 and 2. The ends of the steel cords 5 are therefore uncovered in the end region, that is, are exposed. Both belt or segment ends 1 and 2 are reduced in thickness in the end region apart from the steel cords 5.

The uncovered ends of the steel cords 5 of the belt ends 1 and 2 are clamped between respective mutually-adjacent sets of clamping plates (28, 29) and (31, 32). The two opposite clamping plates (28, 29) and (31, 32) of the belt end 1 and 2 each form a pair of clamping plates (28, 29) and (31, 32).

The magnitude of the ablation of rubber up to the steel cords 5 corresponds approximately to the thickness of the respective sets of clamping plates (28, 29) and (31, 32). The clamping plates (28, 29) and (31, 32) are therefore set virtually in alignment with the belt upper side 18 and belt lower side 22.

The free end of each of the two clamping plates of a pair of clamping plates (28, 29) and (31, 32) has crenellated projections (33, 34) and (35, 36) each having a transverse bore 10. The transverse bores 10 have a vertical elongated slot shape and thus permit thickness tolerances of the belt ends to be compensated for. The crenellated projections 33 and 34 of the two clamping plates 28 and 29 of the one pair of clamping plates (28, 29) are offset with respect to each other and together form a part hinge (33, 34). The crenellated projections 35 and 36 of the two clamping plates (31, 32) of the other pair of clamping plates (31, 32) likewise form a part hinge (35, 36) and are offset together with respect to the crenellated projections (33, 34) of the first pair of clamping plates (28, 29). As a result, the two part hinges (33, 34) and (35, 36) can be joined together to form the hinge 4.

The hinge 4 therefore consists of the two part hinges (33, 34) and (35, 36), the crenellated projections (33, 34) and (35, 36) of which intermesh in such a manner that the transverse bores 10 disposed in the projections (33, 34) and (35, 36) are aligned with one another such that a coupling rod 11 can be introduced through the transverse bores 10 in order to complete the hinge 4.

Only one hinge side is described below. This description also applies similarly to the other hinge side. The part hinges (33, 34) and (35, 36) are of structurally identical design.

The upper clamping plate 28 of a pair of clamping plates (28, 29) has three rows of through bores 25 transversely with respect to the belt width. The lower clamping plate 29 of the pair of clamping plates (28, 29) has three rows of threaded bores 20 transversely with respect to the belt width, the threaded bores lying congruently under the through bores 25.

The two clamping plates (28, 29) of a hinge side form a clamping unit and, with the ends of the steel cords 5 being introduced, are joined fixedly to each other by threaded fasteners 26 and, in the process, press the steel cords 5 which are sandwiched between and lie in longitudinal grooves 37 in the respective inner surfaces of the clamping plates 28 and 29. The depth of the longitudinal grooves 37 is somewhat less than half the diameter of the steel cords 5. As a result, the ends of the steel cords 5 are clamped between the clamping plates (28, 29). The tensile forces of the conveyer belt ends 1 and 2 are transmitted by the steel cords 5 via the clamping plates (28, 29) to the hinge 4.

A further longitudinal groove is arranged next to each longitudinal groove 37 lying closely next thereto at a small distance. The provision of two parallel longitudinal grooves at a small distance makes it possible, during the installation, to compensate for varying cord distances or a parallel offset caused by manufacturing operations.

It is understood that the foregoing description is that of the preferred embodiments of the invention and that various changes and modifications may be made thereto without departing from the spirit and scope of the invention as defined in the appended claims.

LIST OF REFERENCE NUMBERS

Part of the Description

1 Conveyer Belt End
2 Conveyer belt end
3 Steel cord conveyer belt
4 Hinge
5 Steel cables; steel cords
6 Part hinge
7 Part hinge
8 Crenellated projections
9 Crenellated projections
10 Transverse bores
11 Coupling rod
12 Hinge bolt
13 Hinge bolt
14 Integrated clamping plate
15 Integrated clamping plate
16 Stop step
17 Stop step
18 Belt upper side
19 Rubber covering layer, top
20 Threaded bores
21 Ablation
22 Belt lower side
23 Rubber covering layer, bottom
24 Separate clamping plate
25 Through bores
26 Threaded fasteners
27 Separate clamping plate
28 Clamping plate
29 Clamping plate
28, 29 Pair of clamping plates
31 Clamping plate
32 Clamping plate
31, 32 Pair of clamping plates
33 Crenellated projections
34 Crenellated projections
33, 34 Part hinge
35 Crenellated projections
36 Crenellated projections
35, 36 Part hinge
37 Longitudinal grooves

What is claimed is:
1. A conveyor belt defining a longitudinal axis and comprising:
first and second conveyor belt portions;
each one of said conveyor belt portions having a predetermined thickness and including top and bottom layers made of elastomer material;

a reinforcement layer sandwiched between said top and bottom layers;

said reinforcement layer including a plurality of steel cords arranged to be mutually parallel and running in the direction of said longitudinal axis;

each of said conveyor belt portions further including an end section whereat said thickness of the conveyor belt portion is reduced as a consequence of said top and bottom layers being partially removed or removed so as to cause said steel cords to be exposed by said top and bottom layers whereby the end section becomes a thickness-reduced end section;

each of said conveyor belt portions having top and bottom outer surfaces;

each of said conveyor belt portions further including top and bottom clamping plates set into corresponding ones of said outer surfaces at the end section thereof;

said reduced-thickness end section being clamped between said top and bottom clamping plates;

at least one of the clamping plates of each of said conveyor belt portions having a free end facing toward the other one of said conveyor belt portions;

said at least one clamping plate of each of said conveyor belt portions defining a part hinge;

said part hinge of each of said conveyor belt portions being further defined by a plurality of crenellated projections at said free end thereof;

the part hinge corresponding to said first conveyor belt portion being assembleable with the part hinge corresponding to said second conveyor belt portion to conjointly define a hinge connecting said first and second conveyor belt portions to each other; and, each of said part hinges having a bar defining said free end and said bar being disposed transversely to said longitudinal axis.

2. The conveyer belt of claim 1, wherein:

the bar of each one of said part hinges has the plurality of crenellated projections corresponding thereto formed thereon at said free end thereof;

said one clamping plate is the top clamping plate of the part hinge and is formed integrally with the bar thereof;

the bar of each of said part hinges defines a stop lying opposite from the crenellated projections formed on said bar;

the bar and the top clamping plate integrally formed thereon conjointly define a surface running in one plane; and, the top clamping plate of each of said part hinges is seated in the outer surface of the belt portion so as to cause said outer surface of said belt portion and the outer surface of said top clamping plate to conjointly define a common plane.

3. The conveyer belt of claim 2, wherein said top layer of said belt portion is reduced in thickness to accommodate seating said top clamping plate thereon in the end section corresponding thereto; said bottom layer of said belt portion is reduced in thickness to accommodate seating said bottom clamping plate thereon in the end section corresponding thereto; said bottom clamping plate has an end surface lying against the stop of the bar of the part hinge corresponding thereto; and, said conveyor belt further comprises connecting means for connecting the top and bottom clamping plates of each of said conveyor belt portions to each other with the thickness-reduced end section being clamped therebetween.

4. The conveyer belt of claim 1, wherein the top and bottom clamping plates of each one of said conveyor belt portions has respective clamping surfaces; and, at least one of said clamping surfaces has transverse ribs formed therein.

5. The conveyer belt of claim 1, wherein said plurality of crenellated projections of each part hinge is distributed among the top and bottom clamping plates so as to cause said top and bottom clamping plates to conjointly define the part hinge.

6. The conveyer belt of claim 1, wherein said steel cords are mutually spaced one from the other at a predetermined first distance; and, each of said clamping plates has an inner side having a plurality of longitudinal grooves formed therein and spaced apart one from the other at said predetermined first distance.

7. The conveyor belt of claim 1, wherein said conveyor belt portions are respective segments of said conveyor belt.

8. The conveyor belt of claim 1, wherein said first and second belt portions conjointly define a continuous belt having two ends connected together with the two part hinges.

9. A conveyor belt defining a longitudinal axis and comprising:

first and second conveyor belt portions;

each one of said conveyor belt portions having a predetermined thickness and including top and bottom layers made of elastomer material;

a reinforcement layer sandwiched between said top and bottom layers;

said reinforcement layer including a plurality of steel cords arranged to be mutually parallel and running in the direction of said longitudinal axis;

each of said conveyor belt portions further including an end section whereat said thickness of the conveyor belt portion is reduced as a consequence of said top and bottom layers being partially removed or removed so as to cause said steel cords to be exposed by said top and bottom layers whereby the end section becomes a thickness-reduced end section;

each of said conveyor belt portions having top and bottom outer surfaces;

each of said conveyor belt portions further including top and bottom clamping plates set into corresponding ones of said outer surfaces at the end section thereof;

said reduced-thickness end section being clamped between said top and bottom clamping plates;

at least one of the clamping plates of each of said conveyor belt portions having a free end facing toward the other one of said conveyor belt portions;

said at least one clamping plate of each of said conveyor belt portions defining a part hinge;

said part hinge of each of said conveyor belt portions being further defined by a plurality of crenellated projections at said free end thereof;

the part hinge corresponding to said first conveyor belt portion being assembleable with the part hinge corresponding to said second conveyor belt portion to conjointly define a hinge connecting said first and second conveyor belt portions to each other;

said steel cords being mutually spaced one from the other at a predetermined first distance;

each of said clamping plates having an inner side having a plurality of longitudinal grooves formed therein and spaced apart one from the other at said predetermined first distance; and, wherein said longitudinal grooves are first longitudinal grooves; and, a plurality of second longitudinal grooves are likewise formed in each of said clamping plates at a predetermined second distance from corresponding ones of said first grooves less than said predetermined first distance between each two of said first longitudinal grooves.

10. A conveyor belt defining a longitudinal axis and comprising:

first and second conveyor belt portions;

each one of said conveyor belt portions having a predetermined thickness and including top and bottom layers made of elastomer material;

a reinforcement layer sandwiched between said top and bottom layers;

said reinforcement layer including a plurality of reinforcement cords arranged to be mutually parallel and running in the direction of said longitudinal axis;

each of said conveyor belt portions further including an end section whereat said thickness of the conveyor belt portion is reduced as a consequence of said top and bottom layers being partially removed or removed so as to cause said reinforcement cords to be exposed by said top and bottom layers whereby the end section becomes a thickness-reduced end section;

each of said conveyor belt portions having top and bottom outer surfaces and an end edge;

each of said conveyor belt portions further including top and bottom clamping plates set into corresponding ones of said outer surfaces at the end section thereof;

said reduced-thickness end section being clamped between said top and bottom clamping plates;

at least one of the clamping plates of each of said conveyor belt portions having a free end facing toward the other one of said conveyor belt portions;

said at least one clamping plate of each of said conveyor belt portions defining a part hinge;

said part hinge of each of said conveyor belt portions being further defined by a plurality of crenellated projections at said free end thereof;

the part hinge corresponding to said first conveyor belt portion being assembleable with the part hinge corresponding to said second conveyor belt portion to conjointly define a hinge connecting said first and second conveyor belt portions to each other;

each of said part hinges having a bar defining said free end and said bar being disposed transversely to said longitudinal axis;

the bar of each one of said part hinges has the plurality of crenellated projections corresponding thereto formed thereon at said free end thereof;

said one clamping plate is the top clamping plate of the part hinge and is formed integrally with the bar thereof; and, the bar of each of said part hinges defines a stop lying opposite from the crenellated projections formed on said bar for receiving said end edge thereagainst of the conveyor belt portion corresponding thereto.

11. The conveyor belt of claim 10, wherein said reinforcement cords are steel cords.

* * * * *